US009932832B2

(12) United States Patent
Wang et al.

(10) Patent No.: US 9,932,832 B2
(45) Date of Patent: Apr. 3, 2018

(54) METHOD OF BALANCING A SPOOL OF A GAS TURBINE ENGINE

(71) Applicant: Pratt & Whitney Canada Corp., Longueuil (CA)

(72) Inventors: Jiemin Wang, Mississauga (CA); Cameron Walters, Newmarket (CA); Ron Robinson, Brampton (CA); Jeffrey Bernard Heyerman, Oakville (CA); David Beamish, Mississauga (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 717 days.

(21) Appl. No.: 14/289,898

(22) Filed: May 29, 2014

(65) Prior Publication Data

US 2015/0345294 A1 Dec. 3, 2015

(51) Int. Cl.
*F01D 5/02* (2006.01)
*G01M 1/32* (2006.01)

(52) U.S. Cl.
CPC .............. *F01D 5/027* (2013.01); *G01M 1/32* (2013.01); *F05D 2230/60* (2013.01); *F05D 2260/81* (2013.01); *Y10T 29/49321* (2015.01)

(58) Field of Classification Search
CPC ....... G01M 1/32; F05D 2260/81; F01D 5/027
See application file for complete search history.

(56) References Cited

U.S. PATENT DOCUMENTS

| 6,341,419 | B1 | 1/2002 | Forrester et al. |
| 6,587,741 | B1 * | 7/2003 | Chetta ..................... G06F 17/50 700/104 |
| 6,898,547 | B1 | 5/2005 | DeBlois et al. |
| 7,539,594 | B2 | 5/2009 | Lee et al. |
| 7,555,939 | B2 | 7/2009 | Lucas et al. |
| 7,565,257 | B2 | 7/2009 | Lee |
| 7,685,876 | B2 | 3/2010 | Mollmann et al. |
| 7,739,072 | B2 | 6/2010 | DeBlois et al. |
| 7,765,082 | B2 | 7/2010 | Lee |
| 7,792,600 | B2 | 9/2010 | Borneman et al. |
| 7,877,223 | B2 | 1/2011 | Lee et al. |
| 7,974,811 | B2 | 7/2011 | Lee |
| 7,979,233 | B2 | 7/2011 | DeBlois et al. |
| 8,567,060 | B2 * | 10/2013 | Calvert .................... F01D 5/027 29/889.21 |
| 8,720,259 | B1 * | 5/2014 | Benjamin ............. G01M 15/14 73/112.01 |

(Continued)

*Primary Examiner* — Omar F Fernandez Rivas
*Assistant Examiner* — Justin C Mikowski
(74) *Attorney, Agent, or Firm* — Norton Rose Fulbright Canada LLP

(57) ABSTRACT

A method of balancing a spool of a gas turbine engine, the spool including a forward rotor assembly and an aft rotor assembly separated by a spacer, the method comprising: balancing the forward rotor assembly and the aft rotor assembly independently from one another using conventional balancing techniques; and mathematically modeling the spool; applying a modeled axial load to the modeled spool to determine a trim weight which would balance the spool when subjected to the modeled axial load; and physically placing the trim weight to one of the forward rotor assembly and the aft rotor assembly.

12 Claims, 7 Drawing Sheets

(56) References Cited

U.S. PATENT DOCUMENTS

2009/0025461 A1\* 1/2009 Walters .................. F01D 5/027 73/66
2009/0255115 A1\* 10/2009 Kernozicky ............ B23P 6/002 29/889.1
2009/0320286 A1\* 12/2009 Walters .................. F01D 5/027 29/889

\* cited by examiner

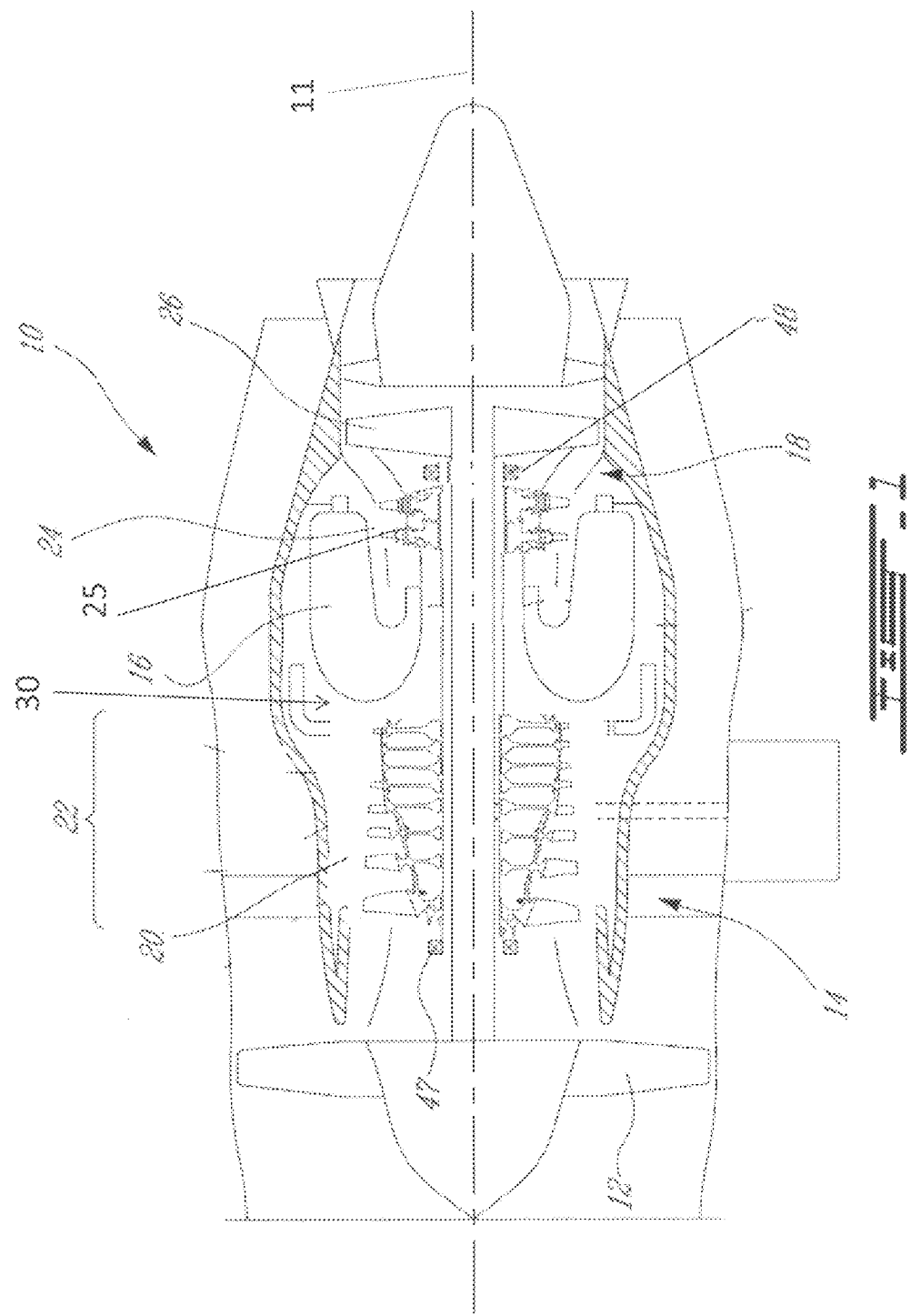

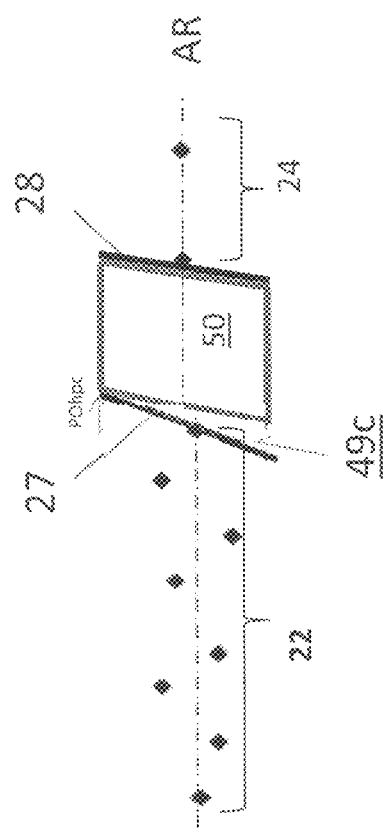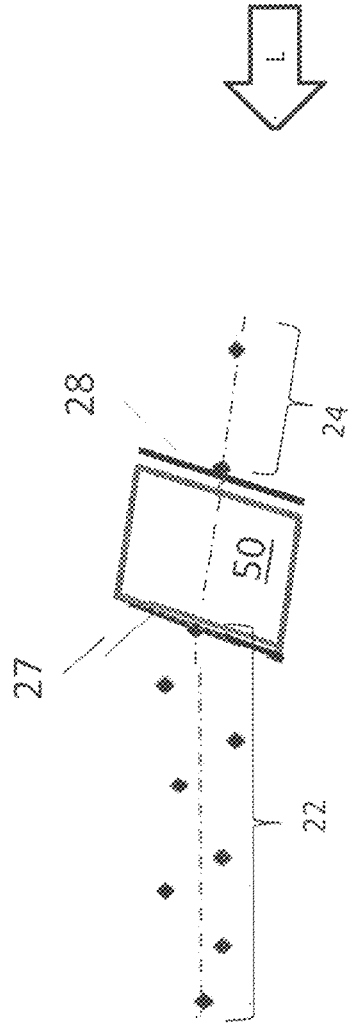

METHOD OF BALANCING A SPOOL OF A GAS TURBINE ENGINE

TECHNICAL FIELD

The invention relates generally to methods for balancing assemblies of rotary components and in particular, high speed rotor assemblies such as those in gas turbine engines.

BACKGROUND OF THE ART

It is routine for gas turbine engines to have to pass stringent vibration acceptance tests during production. Rotor eccentricities are a main source of engine vibration, and eccentricities can be alleviated by rotor balancing. Balancing is the act of aligning the masses and rotational centers of the rotor assembly. Gas turbine engine rotors typically comprise a plurality of rotors, such as multiple compressor or turbine stages, which are bolted or clamped together. Errors present in balancing methods can tend to be magnified by the complicated rotor designs such as the ones found in gas turbine engines, and thus present a risk that an engine will not meet test requirements despite having been balanced according to prior art techniques. If an engine does not pass the vibration acceptance limit, it typically must be disassembled, re-balanced, and reassembled, which wastes time and resources.

SUMMARY

In one aspect, there is provided a method of balancing a spool of a gas turbine engine, the spool including a forward rotor assembly and an aft rotor assembly, the method comprising: mathematically modeling the forward rotor assembly and the aft rotor assembly wherein each of the forward rotor assembly and of the aft rotor assembly are balanced, the modeled forward rotor assembly and the modeled aft rotor assembly being axially disposed and separated by a spacer; virtually rotating one of the modeled forward rotor assembly and the modeled aft rotor assembly so as to minimize a wedge between an aft end of the modeled forward rotor assembly and a forward end of the modeled aft rotor assembly; determining a modeled spacer to be inserted between the aft end of the modeled forward rotor assembly and the forward end of the modeled aft rotor assembly which minimizes the wedge between the modeled forward rotor assembly and the modeled aft rotor assembly; forming a modeled assembly comprising the modeled forward rotor assembly, the modeled spacer, and the modeled aft rotor assembly, the modeled assembly revolving around an axis of rotation; simulating the application of clamping loads at opposed ends of the modeled assembly and determining a change of position of the axis of rotation of the modeled assembly resulting from an angular repositioning, under the clamping load, of the modeled aft rotor assembly relative to the modeled forward assembly; calculating a trim weight which minimizes unbalance of the modeled assembly relative to the axis of rotation resulting of the application of the axial load; and physically placing the trim weight onto one of the forward and aft rotor assemblies In another aspect, there is provided a method of balancing a spool of a gas turbine engine, the spool including a forward rotor assembly and an aft rotor assembly separated by a spacer, the method comprising: balancing the forward rotor assembly and the aft rotor assembly independently from one another; and mathematically modeling the spool; applying a modeled axial load to the modeled spool to determine a trim weight which would balance the spool when subjected to the modeled axial load; and physically placing the trim weight to one of the forward rotor assembly and the aft rotor assembly.

DESCRIPTION OF THE DRAWINGS

Reference is now made to the accompanying figures in which:

FIG. 1 is a schematic cross-sectional view of a gas turbine engine;

FIG. 2b is a close up view of a connection between the HPC and HPT of FIG. 2a;

FIG. 3 is a flow chart of a method of balancing an assembly formed by the HPC and the HPT of FIG. 2a;

FIG. 6 is a schematic of the centers of gravity of rotors of the HPC and the HPT in the second portion shown with a spacer between the HPC and the HPT thereby forming an HPT-spacer-HPT assembly;

FIG. 7 is a schematic of the centers of gravity of the HPC and the HPT and the spacer of FIG. 6 shown with an axial load applied onto the HPT-spacer-HPT assembly.

DETAILED DESCRIPTION

Figure 2A:
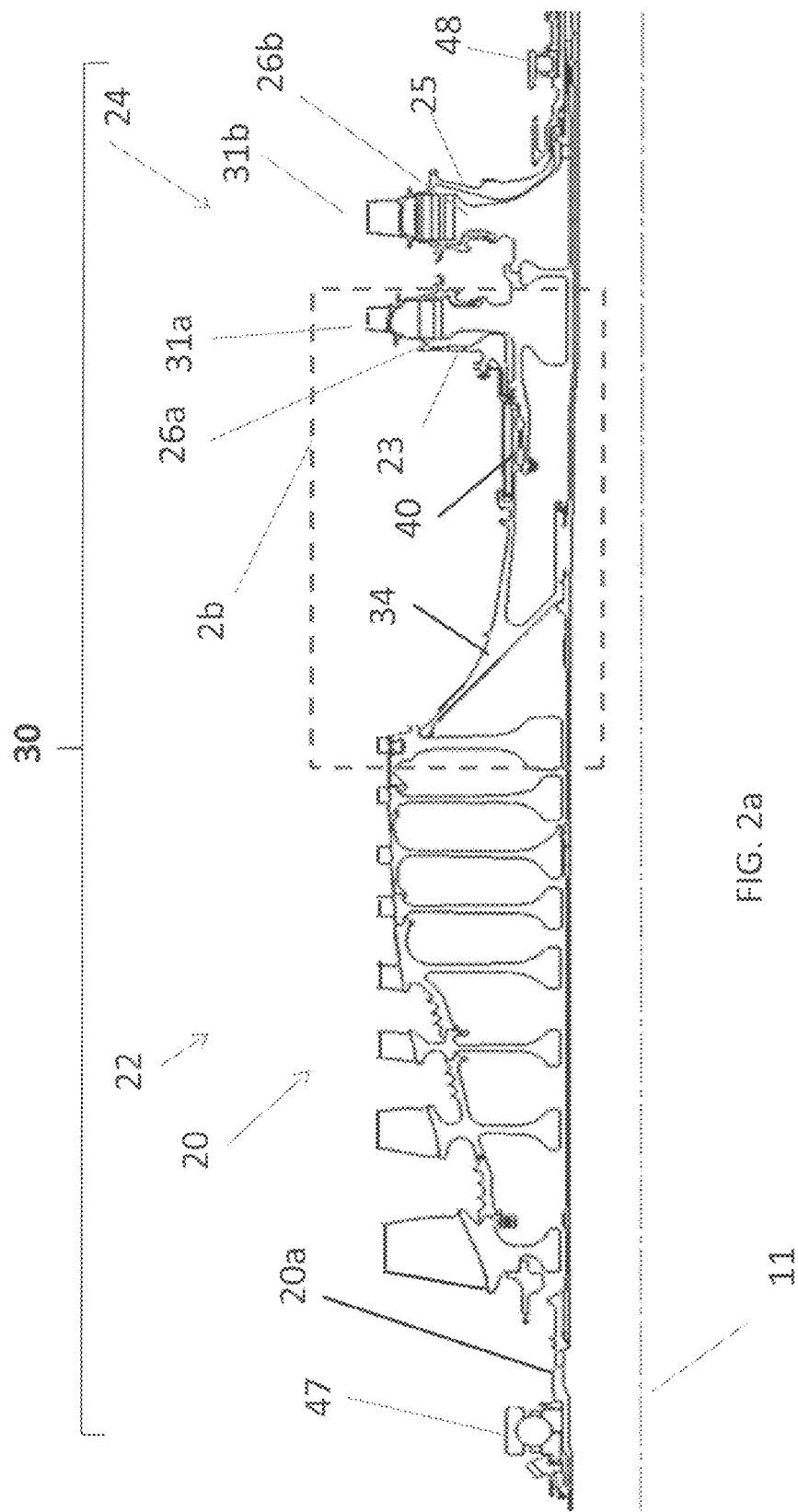
FIG. 2a is a sectional view of a High Pressure Compressor (HPC) and a High Pressure Turbine (HPT) forming a High Pressure spool of the gas turbine engine of FIG. 1.

FIG. 1 illustrates a gas turbine engine 10 generally comprising, in serial flow communication, a fan 12 through which ambient air is propelled, a multistage compressor section 14 for pressurizing the air, a combustor 16 in which the compressed air is mixed with fuel and ignited for generating an annular stream of hot combustion gases, and a turbine section 18 for extracting energy from the combustion gases.

Generally, the gas turbine engine 10 comprises a plurality of assemblies having rotary components mounted for rotation about a centerline axis 11 of the engine 10. For instance, the compressor section 14 may include a high pressure compressor (HPC) 22 module (or pack) having multiple stages, and the turbine section 18 downstream of the combustor 16 may include a high pressure turbine (HPT) 24 module that drives the HPC 22 module. The HPC 22 and the HPT 24 modules form a HPC-HPT assembly commonly referred to as High Pressure spool 30. The turbine section 18 may also include a low pressure turbine (LPT) 26 that drives the fan 12.

Figure 2B:
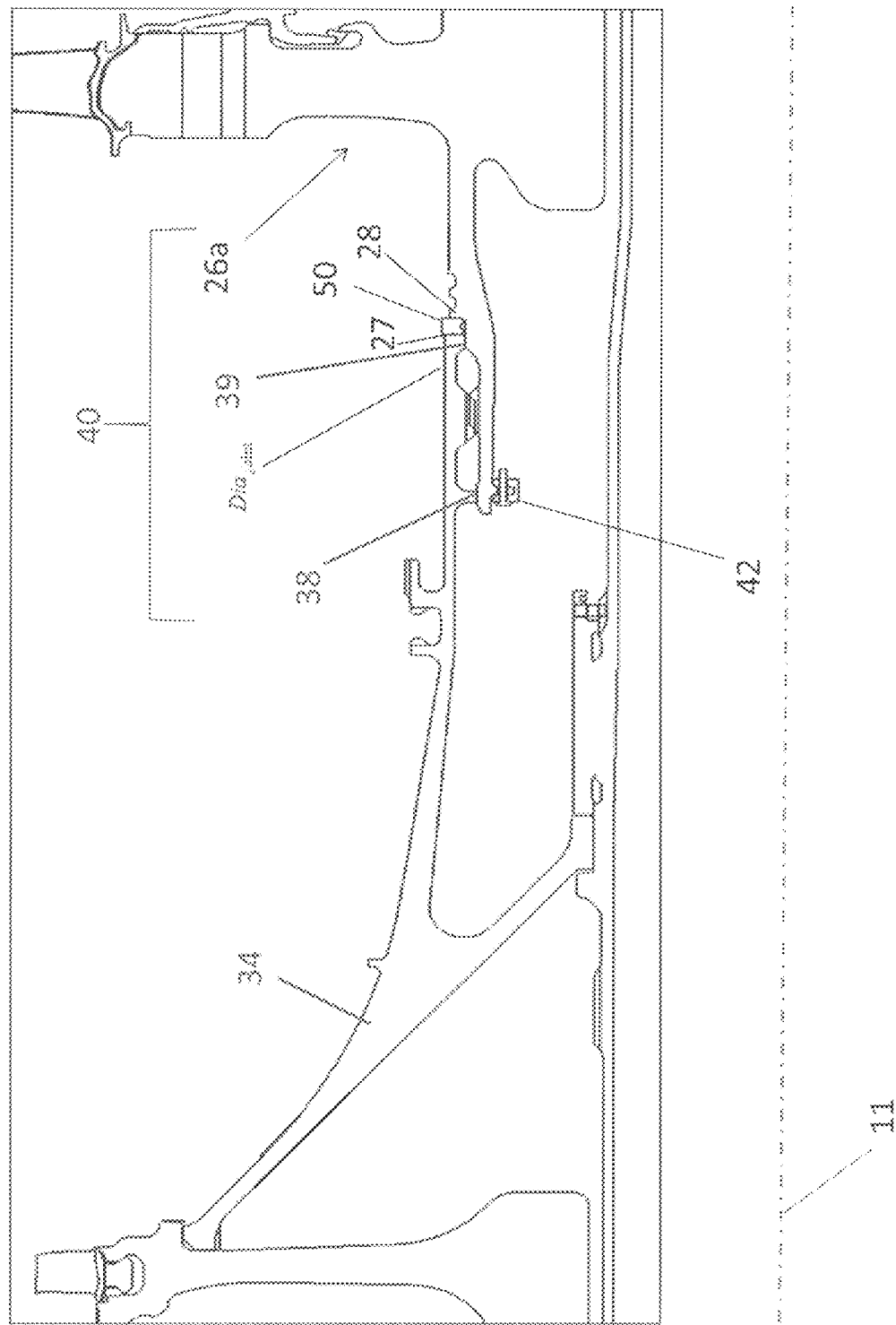
Figure 3:
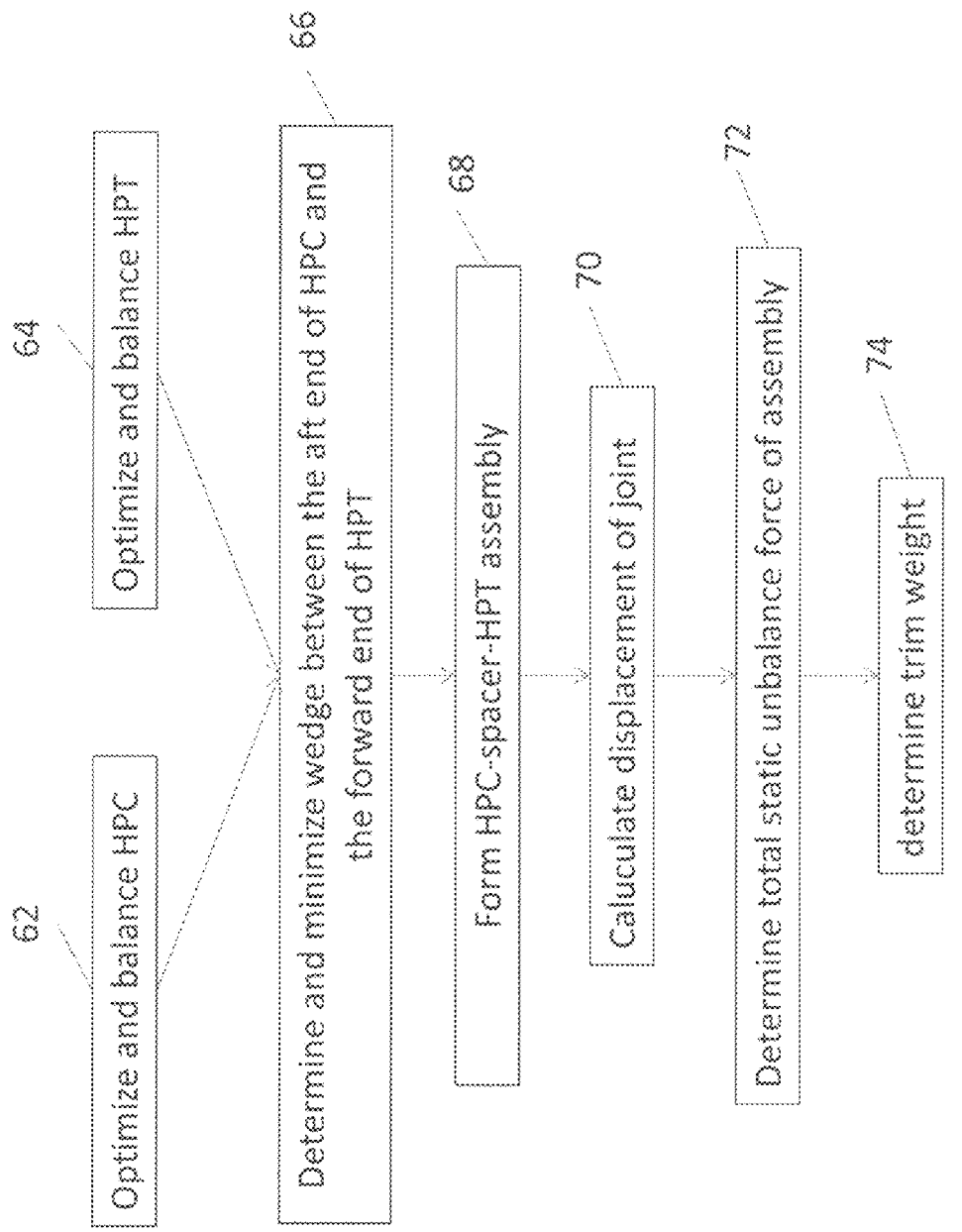

Turning to FIGS. 2a and 2b, the HPC 22 module may include eight rotors 20. It is understood that the HPC 22 may have any number of rotors, including only one stage. Each of the rotors 20 are mounted face-to-face on each of their forward and aft mounting faces (unindicated). A front hub 20a defines a journal for mounting a front bearing 47. A rear hub 34 has a front spigot 38 and rear spigot 39. The rear hub 34 also includes an aft end 27 (shown in FIG. 2b).

The HPT 24 module includes forward and aft turbine rotors 26a and 26b including respective disks carrying circumferential arrays of radially extending blades 31a and 31b, respectively. The HPT 24 module may have any number of stages, including only one stage. The HPT module 24 further comprises a forward cover plate 23 and an aft cover plate 25. The rear hub 34 of the HPC 22 module is adapted to tightly receive in mating engagement a corresponding forward turbine rotor 26a (shown in FIG. 2b). The HPT 24 module is supported at an aft end (unindicated) by a rear bearing 48.

The HPC 22 module and the HPT 24 module are connected to each other at joint 40. The joint 40 includes the rear hub 34 of the aft compressor component and the forward most turbine rotor 26a.

Turning to FIG. 2b, the rear hub 34 in this embodiment has two axially-extending circumferential spigot contact diameters 38 and 39. The two spigot contact diameters 38, 39 are tight fit radially with the two outside diameters of the forward turbine rotor 26a and separated axially by a short distance to establish a fixed centerline geometry. This geometry may impose a slightly different alignment of the HPT 24 module relative to the HPC 22 module than the single rear face and single rear spigot which may dictate the relative geometry of the two modules 22, 24 to each other. The forward turbine rotor 26a of the HPT 24 module has two corresponding mating axially-extending circumferential spigot contact diameters respectively. The respective pairs of spigot contact diameters are adapted to telescopically engage by way of tight fit. Mating in this way, the spigots dictate the relative alignment between the HPC 22 module and HPT 24 module. In other words, the HPT 24 module's radial positioning (i.e. relative to the centreline axis 11) is based on the spigot alignment with the HPC 22 module. Deviations in spigot alignment result in deviations in alignment between the HPC and HPT modules. A spacer 50 is axially positioned between the rear hub 34 and the forward turbine rotor 26a to axially positions the HPC 22 module relative to the HPT 24 module. The spacer 50 is used to axially restrain the rear hub 34 and the forward turbine rotor 26a when the spool 30 is subject to a compressive axial load L (shown in FIG. 7). As will be described below, the spacer 50 is part of a method of balancing the spool 30.

The front and rear bearings 47 and 48 support the spool 30 in the engine 10. The front and rear bearings 47 and 48 also define an axis of rotation AR of the spool 30 which coincides with the centerline axis 11 of the engine 10. It is desirable to minimize radial eccentricity of the spool 30 from the engine centerline axis 11, in order to reduce rotor imbalance and, thus, vibration during engine operation. Although each rotary component of a gas turbine engine is manufactured with precision, it remains that tolerance effects result in components which, among other things, are slightly off-center relative to (i.e. lack concentricity with) the axis of rotation and which have less than perfectly parallel mating faces (i.e. faces are not square). The effect of such eccentricities relative to the nominal engine centreline which, if ignored, may cause radial rotor deflection (i.e. vibration) in use. Consequently, these imperfections increase the vibration amplitude of an assembly and can result in considerable unbalance in the gas turbine engine.

There are thus at least two types of geometric deviations due to tolerancing which are considered in gas turbine rotor balancing, namely (1) lack of concentricity of axially-extending surfaces with a datum axis, or the existence of an eccentricity between a geometric centre of the surface of interest and a selected datum (such as a shaft centreline), and (2) lack of parallelism of radially-extending faces, or a deviation from parallel between a face and a selected datum face. Lack of concentricity is sometimes referred in the art (and herein) to as radial deviation, radial offset, radial run-out, centerline deviation or perpendicular plane deviation. Lack of parallelism is sometimes referred to in the art (and herein) as planar offset, angular offset, angular deviation, plane deviation, bi-plane deviation or face squareness deviation.

Tolerance effects in individual components can be addressed during assembly to provide a more balanced assembly, such as by adding counterbalance weights, and or by adjusting the relative angular alignment of components (known as stacking) to offset the unbalances of individual components against each other, to provide a cancellation effect with respect to the overall assembly. For example, two components having radial deviations can be angularly aligned with the radial deviations positioned 180 degrees from one another, to minimize their cumulative effect. In multi-piece assemblies, such as the spool 30, balancing optimization becomes more complex.

A lack of concentricity or radial deviation of the axially-extending spigot contact diameters between the rear hub 34 and the forward turbine rotor 26a may lead to an assembly unbalance if not taken into account when assembling the forward turbine rotor 26a to the rear hub 34 of the compressor 22. Furthermore, if the radially-extending abutment faces of a component are not parallel to one another, the interaction between the component and adjacent rotor components creates a mismatch between mating faces, which tends to cause unbalance. The interaction between adjacent components is affected such that the center of mass of the HPC 22 module or the HPT 24 module is offset or displaced from the axis of rotation AR. A displaced center of mass in the HPC 22 module or the HPT 24 module, for example, may perform an orbital trajectory around the desired axis of rotation during operation thus creating vibration. Typically, the greater the displacement, the greater the vibration.

Rotor assemblies unbalance, such as in the spool 30, can be minimized by adjusting the stacking angle of each component of each of the spool 30 in relation to the other rotor components of the spool 30, so as to cumulatively minimize the unbalancing effect of the lack of concentricity and the non-parallelism of the mounting ends (also referred to as radial abutment faces) of the rotor components. The stacking angle of each component is adjusted by rotating the component relative to adjoining component(s) about the axis of rotation AR. By optimizing the relative stacking angles for each component of the spool 30, the overall balance of the spool 30 can be optimized, by aligning the individual components so that unbalances are subtractive, rather than additive, tending to cancel one another out. This can result in an overall assembly with a minimal possible imbalance for a given set of components. U.S. Pat. No. 8,567,060, the entirety of which is incorporated herein by reference, discloses an example of balancing of the HPC 22 module. U.S. Pat. No. 7,912,587, the entirety of which is incorporated herein by reference, discloses an example of balancing of the HPT 24 module.

While each of the HPC 22 module and the HPT 24 module may be individually balanced, the cumulative effect of the balanced HPC 22 and HPT 24 modules may not lead to a balanced spool 30.

Turning now to FIGS. 3 to 8, a method 60 of balancing the spool 30 will be described. The method 60 uses a mathematical modeling of the spool 30 to predict a trim weight to be applied to the spool 30 so as to balance the spool 30 before physically assembling the spool 30. The words "theoretical", "mathematical", "virtual" will be used interchangeably in this specification to indicate the non-physical aspects described.

The method 60 starts at step 62 and step 64 with the mathematical modeling of the HPC 22 module and the HPT 24 module independently from one another. The HPC 22 module and the HPT 24 module are stack optimized and physically balanced. In one embodiment, the rotor's indexing or clocking angles relative to the front hub 20a of the HPC 22 module are calculated by a stacking software. The clocking angles determined by the stacking software may provide optimal positioning of the rotors of the HPC 22 module relative to each other and thereby a better balanced HPC 22 module when assembled following these clocking angles. In another embodiment, balancing is achieved by physically balancing the rotor on a balance machine instead or in addition to using the stacking software. Stacking optimization by the stacking software may include the calculation of the position and value of the centres of gravity (i.e. radial deviation) of each rotor 20 (resp. turbine disk 26a, 26b) of the HPC 22 module (resp. HPT 24 module) as well as their planar offset (i.e. deviation from an axis perpendicular to the axis of rotation AR).

Figure 4:
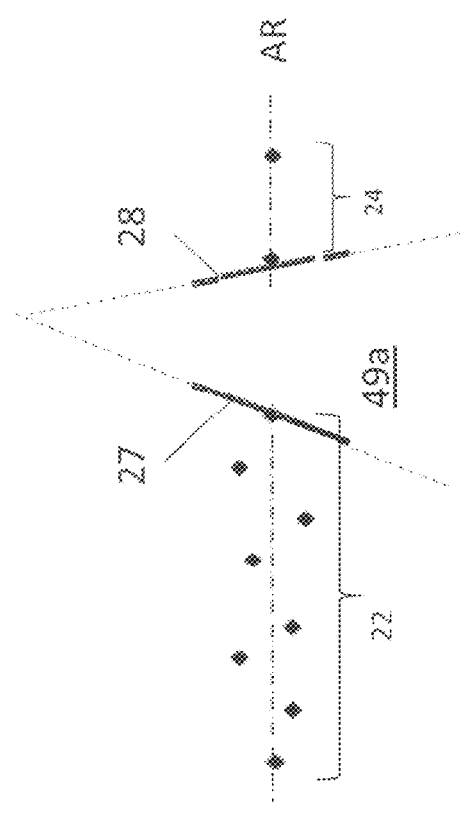
FIG. 4 is a schematic of centers of gravity of rotors of the HPC and the HPT in a first portion relative to an axis of rotation of the HPC and the HPT.

FIG. 4 is a schematic of the positions of the centers of gravity (shown with diamond dots) of the rotors 20 of the HPC 22 and rotors 26a,b of the HPT 24 relative to the axis of rotation AR of the spool 30. The front hub 20a of the HPC 22 module (i.e. the most forward component of HPC 22 module) being connected to the front bearing 47, its radial offset is null or almost null. A rear of the HPT 24 module (i.e. rear of turbine rotor 26b) being connected to the rear bearing 48, its radial offset is null or almost null. A rear of the HPC 22 module (i.e. aft end 27 of the rear hub 34) has its radial offset is null or almost null due to the planar offset of aft end 27 which is measured at the HPC 22 module level using the front bearing 47 and the rear spigot 39 as datum's. Similarly, a front of the HPT 24 module (i.e. forward end 28 of the forward turbine disk 26a) has its radial offset is null or almost null because it is the stacking datum of the HPT 24 module. FIG. 4 shows also a planar offset of the aft end 27 of the rear hub 34, which is the last rotor component of the HPC 22 module, and a planar offset of the forward end 28 of the forward turbine rotor 26a, which is the first rotor component of the HPT 24 module.

As mentioned hereinbefore, the rotors 20 of the HPC 22 module are rotated relative to one another such that their angular offset minimizes the unbalance of the HPC 22 module. Likewise, the rotors 26a, 26b of the HPT 24 module are rotated relative to one another to minimize the unbalance of the HPT 24 module. These rotation operations are known as clocking. The rotation may be done physically or theoretically using an optimisation routine implemented in a stacking software of the gas turbine engine 10. An example of optimization of the HPC 22 module is described in U.S. Pat. No. 8,567,060, the entirety of which is incorporated herein by reference. An example of optimization of the HPT 24 module is described in U.S. Pat. No. 7,912,587, the entirety of which is incorporated herein by reference. The HPC 22 and the HPT 24 modules are optimized independently from one another. They may be optimized at the same time or one after the other in any order. The HPC 22 and the HPT 24 modules may be physically assembled at steps 62 and 64 or at later steps.

From step 62 and 64, the method 60 goes to step 66, where a wedge 49a is formed between the planar offset at the aft end 27 of the rear hub 34 and the planar offset at forward end 28 of the forward turbine rotor 26a is determined. While the planar offset of the aft end 27 of the rear hub 34 can be determined from the calculations performed at step 62, it may be more precise to measure the planar offset of the aft end 27, using for example Precitech measuring equipment. When assembling the rotors 20 to form the HPC 22 module, spigots between the rotors 20 may induce errors which accumulate over the stacking of the multiple rotors 20 and may become significant in cases like the HPC 22 module where a larger plurality of rotors are involved. The planar offset of the forward end 28 of the forward turbine rotor 26a can be determined from the calculations performed at step 64, the HPT 24 module having only two disks involved according to the illustrated example.

Figure 5:
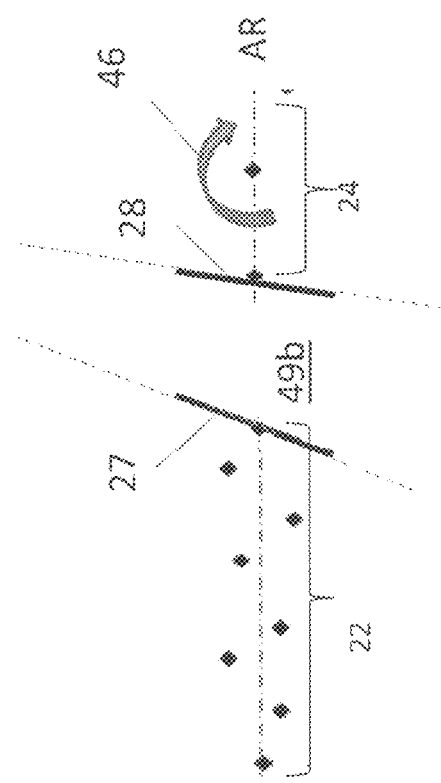
FIG. 5 is a schematic of the centers of gravity of rotors of the HPC and the HPT in a second portion relative to an axis of rotation of the HPC and the HPT.

As can be appreciated from FIGS. 4 and 5, the angular positions of the aft end 27 of the rear hub 34 and the forward end 28 of the forward turbine rotor 26a are then adjusted so as to minimize the wedge 49a into the wedge 49b. The adjustment is done by virtually rotating the whole HPC 22 module and the HPT 24 module relative to one another about the axis of rotation AR (i.e. clocking, see arrow 46). In the example shown in FIG. 5, the HPT 24 module is rotated relative to the HPC 22 module so as to bring the opposed end faces 27 and 28 parallel as much as possible. It is however contemplated that the HPC 22 module could be rotated relative to HPT 24 module. After rotation, the aft end 27 of the rear hub 34 and the forward end 28 of the forward turbine rotor 26a should be almost parallel to each other making the wedge 49a minimal into the wedge 49b (FIG. 5). The virtual rotation needed to minimize the wedge 49a is determined by the stacking software using the values of the angular positions of the aft end 27 of the rear hub and the forward end 28 of the forward turbine rotor 26a. The HPC 22 module and the HPT 24 module are not assembled to each other at step 66.

From step 66, the method 60 goes to step 68, where the spacer 50 is theoretically introduced between the aft end 27 of the rear hub and the forward end 28 of the forward turbine rotor 26a. By theoretically, one should understand that the spacer 50 is not physically put between the HPC 22 module and the HPT 24 module at this time, but instead that its dimensions are known and inputted to the stacking software so that the stacking software can calculate positions or reactions of a virtual spool 30 formed by the HPC 22, HPT 24 modules and the spacer 50.

The spacer 50 may be a classified spacer, or a customized spacer having a shape conforming to that of a space left between the aft end 27 of rear hub 34 and the forward end 28 of the forward turbine rotor 26a. The value of minimized wedge 49b may be used to make the customized spacer or to select the classified spacer closest to the space left between the aft end 27 of the rear hub 34 and the forward end 28 of the forward turbine rotor 26a. Even with a custom-made spacer, there may be a remaining gap (i.e. wedge 49c) between the spacer 50 and the aft end 27 of the rear hub 34 or between the spacer 50 and the forward end 28 of the first turbine rotor 26a. FIG. 6 shows an example of gap (or remaining wedge 49c) between the spacer 50 and the aft end 27 of the rear hub 34. The gap 49 may be calculated using the known planar offsets of the HPC 22 module, the HPT 24 module, and the spacer 50 itself.

The modeled planar offset $\vec{R}_{gap}$ of the wedge 49c may be expressed as follows:

$$\vec{R}_{gap} = \vec{PO}_{HPC} - \vec{PO}_{HPT} - \vec{PO}_{spacer}, \qquad (2)$$

where $\vec{PO}_{HPC}$, $\vec{PO}_{HPT}$ and $\vec{PO}_{spacer}$ are planar offsets of HPC 22 module (i.e. of the aft end 27 of the rear hub 34), HPT 24 module (i.e. of the forward end 28 of the forward turbine rotor 26a) and of the spacer 50 respectively. Both $\vec{PO}_{HPC}$, and $\vec{PO}_{spacer}$ may be measured using Precitech measuring equipment, and $\vec{PO}_{HPT}$ may be a predicted value from the optimization of HPT 24 module. However, $\vec{PO}_{HPT}$ may also be a measured value.

From step 68, the method 60 goes to step 70, where a displacement at the joint 40 is calculated. In order to recreate the conditions experienced by the HPC 22 module and the HPT 24 module when they will be assembled in the gas turbine engine 10, axial load L are axially applied to the HPC-spacer-HPT assembly (i.e. virtual spool 30). The axial load L corresponds to clamping forces applied to the HPC-spacer-HPT assembly. Because of the presence of the gap 49, the axial load L will induce a displacement (or angular repositioning) of the HPT 24 relative to the HPC 22 about the joint 40 which induces a kink or bend at the joint 40. In the example shown in the Figures, the rear bearing 48 is forced downwards by the axial load L. The displacement results from an angular repositioning, under the axial load L, of the modeled HPT 24 relative to the modeled HPC 22 module. This displacement induces the axis of rotation AR to be displaced to a new axis of rotation AR' since the rear bearing 48 has displaced. Taking the axis of rotation AR' as a reference, the displacement of the HPC 22 may be calculated as a displacement of the joint 40. The displacement at the joint 40 may be both radial and axial. The vector of displacement $\vec{D}_{joint}$ at the joint 40 can be calculated from:

$$\vec{D}_{joint} = S_f \times \frac{\vec{R}_{gap} \times L_{hpt} \times L_{hpc}}{Dia_{joint} \times L_{total}} \quad (2)$$

where $S_f$ is the stiffness factor of the spool 30, $\vec{R}_{gap}$ a modeled planar offset of the gap 49 after loading the modeled spool 30 with the axial load L, $Dia_{joint}$ is the diameter of joint, and $L_{hpt}$, $L_{hpc}$ and $L_{total}$ represent an axial length of the HPC 22 module, HPC 24 module and spool 30 respectively. The stacking software may calculate and record the direction and value of $\vec{D}_{joint}$ calculated with the above formula for use in later steps. The stiffness factor $S_f$ represents how much the gap or remaining wedge 49c would close when applying the axial load L. The stiffness factor $S_f$ may be determined by finite element analysis. The stiffness factor's value $S_f$ could be anywhere between 0.0 to 1.0 depending on the spool 30 geometry, material property of rear hub 34 of HPC 22 module and forward turbine 26a of HPT 24 module, and the axial load L. The stiffness factor's value $S_f$ could even be 1.0 should the remaining wedge 49c fully closed by the axial load L. The stiffness factor's value $S_f$ may be based on the part young's modulus of the material and deflection versus load calculations. Assembled part bending stiffness and axial load L may be inputs to this calculation. The diameter of joint $Dia_{joint}$ is the aft end outside diameter of rear hub 34 (shown in FIG. 2b).

From step 70, the method 60 goes to step 72, where a total rotor static unbalance $\vec{U}_{total}$ is calculated based on the above calculated virtual displacement $\vec{D}_{joint}$ at the joint 40. The total rotor unbalance $\vec{U}_{total}$ is referred herein as "static" to indicate that the calculation produces a weight to correct for the unbalance of a rotor or rotor assembly, such as the spool 30, where its rotation speed in terms of RPM is not considered in the calculation, as opposed to dynamic balancing which produces a weight to correct for the unbalance of the rotor or rotor assembly where its rotation in terms of RPM is considered in the calculation. While the HPC, HPT modules 22, 24 have been dynamically balanced at steps 62 and 64, and the assembly of the two modules 22, 24 is statically balanced at step 72. In a first sub-step, the new axis of rotation AR' is determined. As mentioned above, the new axis of rotation AR' is the axis passing through the front bearing 47 and the rear bearing 48 based on a position of the rear bearing 48 when the spool 30 is subject to the axial load L and the joint 40 displaced by the displacement $\vec{D}_{joint}$. In a second sub-step, the total rotor static unbalance $\vec{U}_{total}$ may be calculated by the stacking software by calculating the radial offsets $\vec{R}_i$, $\vec{R}_j$ of the rotors of the HPC 22 and HPT 24 modules relative to the new axis of rotation AR'.

For the HPC 22 module:

$$\vec{R}_i = \vec{r}_i + \frac{\vec{D}_{joint} \times L_i}{L_{hpc}} \quad (3)$$

where i is a given rotor 20 of the HPC 22 module and $\vec{r}_i$ is the radial offset rotor relative to the axis of rotation AR before application of the axial load L.

Figure 8:
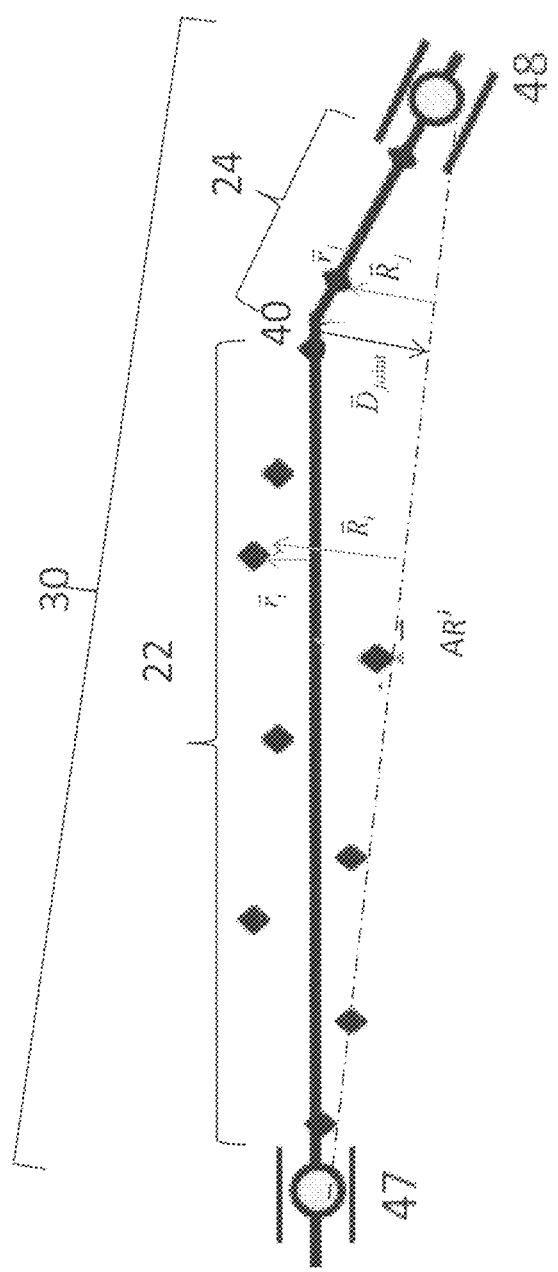
FIG. 8 is a schematic showing force vectors of the HPT-spacer-HPT assembly and a new axis of rotation of the HPT-spacer-HPT assembly consequent to the axial load applied onto the HPT-spacer-HPT assembly.

For the HPT 24 module:

$$\vec{R}_j = \vec{r}_j + \frac{\vec{D}_{joint} \times L_j}{L_{hpt}} \quad (4)$$

where j is a given turbine rotors 26a,b of the HPT 24 module and $\vec{r}_j$ is the radial offset rotor relative to the axis of rotation AR before application of the axial load L. FIG. 8 illustrates the vectors $\vec{r}_i$, $\vec{r}_j$, $\vec{R}_i$, $\vec{R}_j$, the new axis of rotation AR' and the displacement $\vec{D}_{joint}$.

The total rotor static unbalance $\vec{U}_{total}$ is expressed as:

$$\vec{U}_{total} = \sum_{i=1}^{n} M_i \times \vec{R}_i + \sum_{j=1}^{m} M_j \times \vec{R}_j \quad (5)$$

where $M_i$ and $M_j$ are the mass of ith and jth rotor respectively. The masses $M_i$, $M_j$ may be the nominal or the average weight of the ith and jth rotors.

From step 72, the method goes to step 74, where the total rotor static unbalance $\vec{U}_{total}$ is used to determine a trim weight TW for the spool 30. The trim weight TW is a weight applied to a front rim 42 (shown in FIG. 2b) of the first turbine disk 26a, and which acts as a counter effect to the total rotor static unbalance $\vec{U}_{total}$ so as to provide greater balance to the spool 30. The trim weight TW value corresponds to a value of the total rotor static unbalance $\vec{U}_{total}$, and a position of the weight is at 180 degree from a point of origin of the total rotor static unbalance $\vec{U}_{total}$:

$$TW = U_{total}/R_{rim} + 180 \quad (6)$$

Where $R_{rim}$ is the radius of the front rim 42 of the first turbine disk 26a. The total rotor static unbalance $\vec{U}_{total}$ is calculated by the stacking software and the result is displayed to enable a person to select the trim weight TW calculated above. Once the trim weight TW is determined, one can physically put the trim weight TW onto the front rim 42 before assembling the HPT 24 module with the HPC 22 module. The 180 degree in the formula indicates that the trim weight TW has to be installed onto the front rim 42 in an opposite direction of predicted imbalance $\vec{U}_{total}$. The trim weight TW could be placed at positions other than the front rim 42. The weight may not be far from the front rim 42, i.e. nearly an axial middle point of the spool 30. The trim weight TW may axially close to the joint 40.

All the steps of the method 60 may be carried without the spool 30 to be physically assembled. The HPC 22 module and the HPT 24 module may be optimised each at a given geographic location and the trim weight determined and positioned onto the front rim 42 of the first turbine rotor 26a before assembly of the HPT 22 module, the HPC 24 module and the spacer 50. The HPC 22 module may be formed into a balanced HPC 22 module at any time after step 62, and the HPT 24 module may be formed into a balanced HPT 24 module at any time after step 64. The trim weight TW may be disposed onto the front rim 42 of the first turbine rotor 26a before the spool 30 is formed.

With the above method, the trim weight TW may be predicted, and optionally disposed on the front rim 42, without physically assembling the spool 30. This reduces a number of steps need to balance the spool 30, which in turn reduces time to assembled the balanced spool 30. The HPT 24 module and trim weight TW mounted thereon may be shipped to a remote assembly location where they will be assembled to the HPC 22 module. The balanced spool 30 may be then obtained after connection with the HPC 22 module without any additional balancing (physical or mathematical).

The above description is meant to be exemplary only, and one skilled in the art will recognize that changes may be made to the embodiments described without departing from the scope of the invention disclosed. For example, the above method is not limited to gas turbine rotors but could be adapted to any simply supported rotor composed with multiple rotational components. Still other modifications which fall within the scope of the present invention will be apparent to those skilled in the art, in light of a review of this disclosure, and such modifications are intended to fall within the appended claims.

The invention claimed is:

1. A method of balancing a spool of a gas turbine engine, the spool including a forward rotor assembly and an aft rotor assembly, the method comprising:
    mathematically modeling the forward rotor assembly and the aft rotor assembly wherein each of the forward rotor assembly and of the aft rotor assembly are balanced, the modeled forward rotor assembly and the modeled aft rotor assembly being axially disposed and separated by a spacer;
    virtually rotating one of the modeled forward rotor assembly and the modeled aft rotor assembly so as to minimize a wedge between an aft end of the modeled forward rotor assembly and a forward end of the modeled aft rotor assembly;
    determining a modeled spacer to be inserted between the aft end of the modeled forward rotor assembly and the forward end of the modeled aft rotor assembly such that the modeled spacer is tailored to minimize a gap between the modeled forward rotor assembly and the modeled aft rotor assembly and to minimize the wedge;
    forming a modeled assembly comprising the modeled forward rotor assembly, the modeled spacer, and the modeled aft rotor assembly, the modeled assembly revolving around an axis of rotation;
    simulating the application of clamping loads at opposed ends of the modeled assembly and determining a change of position of the axis of rotation of the modeled assembly resulting from an angular repositioning, under the clamping load, of the modeled aft rotor assembly relative to the modeled forward assembly;
    calculating a trim weight which minimizes unbalance of the modeled assembly relative to the axis of rotation resulting of the application of the axial load;
    and physically placing the previously calculated trim weight onto one of the forward and aft rotor assemblies.

2. The method as defined in claim 1, further comprising physically assembling the spool after physically placing the trim weight onto the one of the forward and aft rotor assemblies.

3. The method as defined in claim 1, wherein the modeled assembly includes a joint between one of the spacer and the aft end of the modeled forward rotor assembly and between the spacer and the forward end of the modeled aft rotor assembly; and
    determining the position of the axis of rotation of the modeled assembly resulting of the application of the axial load comprises calculating a displacement of the joint resulting from applying an axial load to the modeled assembly.

4. The method as defined in claim 3, wherein the displacement of the joint is expressed as a vector $$\vec{D}_{joint} = S_f \times \frac{\vec{R}_{gap} \times L_{hpt} \times L_{hpc}}{Dia_{joint} \times L_{total}},$$

where $S_f$ is a stiffness factor of the modeled assembly, $\vec{R}_{gap}$ is a modeled planar offset of the gap resulting from applying the axial load to the modeled assembly, $Dia_{joint}$ is the diameter of joint, and $L_{hpt}$, $L_{hpc}$ and $L_{total}$ represent an axial length of the forward rotor assembly, aft rotor assembly and of the modeled assembly respectively.

5. The method as defined in claim 4, wherein the stiffness factor $S_f$ represents how much the gap would close when applying axial load and is comprised between 0 and 1.

6. The method as defined in claim 4, wherein calculating the trim weight comprises calculating an unbalance of the modeled assembly, the unbalance depending on masses of rotors of the spool and radial offsets of the rotors relative to the axis of rotation before and after application of the axial load, the unbalanced being expressed as $$\vec{U}_{total} = \sum_{i=1}^{n} M_i \times \vec{R}_i + \sum_{j=1}^{m} M_j \times \vec{R}_j$$

where $M_i$ and $M_j$ are masses of ith rotor of the forward rotor assembly and jth rotor of the aft rotor assembly, $\vec{R}_i$ a radial offset of the ith rotor of the forward rotor assembly relative to the axis of rotation of the modeled assembly resulting of the application of the axial load, and, $\vec{R}_j$ a radial offset of the jth rotor of the aft rotor assembly relative to the axis of rotation of the modeled assembly resulting of the application of the axial load, wherein $$\vec{R}_i = \vec{r}_i + \frac{\vec{D}_{joint} \times L_i}{L_{hpc}} \text{ and } \vec{R}_j = \vec{r}_j + \frac{\vec{D}_{joint} \times L_j}{L_{hpt}}$$

with $\vec{r}_i$ being a radial offset of the ith rotor of the forward rotor assembly relative to the axis of rotation before application of the axial load, and $\vec{r}_j$ is a radial offset of the jth rotor of the aft rotor assembly relative to the axis of rotation before application of the axial load.

7. The method as defined in claim 1, wherein calculating the trim weight comprises calculating an unbalance of the modeled assembly, the unbalance depending on masses of rotors of the spool and radial offsets of the rotors relative to the axis of rotation before and after application of the axial load.

8. The method as defined in claim 1, further comprising rotating one of the modeled forward rotor assembly and the modeled aft rotor assembly so as to minimize the wedge between them before determining the modeled spacer.

9. The method as defined in claim 1, wherein the forward rotor assembly is a High Pressure Compressor (HPC) and the aft rotor assembly is a High Pressure Turbine (HPT).

10. A method of balancing a spool of a gas turbine engine, the spool including a forward rotor assembly and an aft rotor assembly, the method comprising:

balancing the forward rotor assembly and the aft rotor assembly independently from one another; and mathematically modeling the spool;

determining a modeled spacer separating the forward rotor assembly and the aft rotor assembly, such that the modeled spacer is tailored to minimize a gap and a wedge therebetween;

applying a modeled axial load to the modeled spool to determine a trim weight which would balance the spool when subjected to the modeled axial load;

and physically placing the previously determined trim weight to one of the forward rotor assembly and the aft rotor assembly.

11. The method as defined in claim 10, further comprising physically assembling the spool after physically placing the trim weight to one of the forward rotor assembly and the aft rotor assembly.

12. A method of balancing a high pressure spool of a gas turbine engine, the high pressure spool including High Pressure Compressor (HPC) and a High Pressure Turbine (HPT), the method comprising:

balancing the HPC and the HPT independently from one another;

determining a modeled spacer separating the HPC and the HPT such that the modeled spacer is tailored to minimize a gap and a wedge therebetween;

and using a mathematical modeling of the spool to predict a trim weight to be applied to the high pressure spool;

and physically assembling the high pressure spool including the previously determined trim weight.

* * * * *